United States Patent [19]

Hu

[11] Patent Number: 5,124,566
[45] Date of Patent: Jun. 23, 1992

[54] SHUTOFF CIRCUIT FOR SENSOR CONTROLLED SWITCH

[75] Inventor: Charles C. Hu, San Jose, Calif.

[73] Assignee: The Watt Stopper, Santa Clara, Calif.

[21] Appl. No.: 585,346

[22] Filed: Sep. 19, 1990

[51] Int. Cl.[5] .................. H01H 35/00; H01H 83/12
[52] U.S. Cl. ............................. 307/116; 363/89
[58] Field of Search ............... 307/116, 117, 118, 112, 307/113, 132 EA, 132 E, 125, 126, 139; 361/92, 169.1, 168.1; 340/552, 554; 363/89, 126; 323/267, 324

[56] References Cited

U.S. PATENT DOCUMENTS

| | | | |
|---|---|---|---|
| 4,183,071 | 1/1980 | Russell | 361/59 |
| 4,820,938 | 4/1989 | Mix et al. | 307/117 |
| 4,874,962 | 10/1989 | Hermans | 307/116 |
| 5,001,623 | 3/1991 | Magid | 307/130 |

Primary Examiner—A. D. Pellinen
Assistant Examiner—Richard Elms
Attorney, Agent, or Firm—Townsend and Townsend

[57] ABSTRACT

The present invention provides a shutoff circuit for a sensor controlled switching apparatus which does not require an additional high current switch. A two pole low current switch is used with one pole providing a control signal to the high current switch to open the high current switch. The other pole is connected between the AC line and a rectifier for a voltage regulator for the sensor circuitry. The second pole of the low current switch removes the power from the sensor circuitry. By piggy-backing a second pole on the switch, this switch can activate the primary power switch connected in series with the AC line without requiring a separate switch inserted in the AC line itself.

7 Claims, 2 Drawing Sheets

1

SHUTOFF CIRCUIT FOR SENSOR CONTROLLED SWITCH

BACKGROUND OF THE INVENTION

The present invention relates to circuits for shutting off a sensor controlled switch coupled between an AC line and an AC load.

Automatic, sensor-controlled switches are often used for certain AC loads, such as lights. These sensors might detect sound or motion in a room to turn on or off lights, for instance. Such a sensor circuit couples to the AC line and derives its power from the AC line voltage. One such sensor controlled switching circuit is shown in U.S. Pat. No. 4,820,938.

It is desirable to have a manually operated switch which will turn off such a sensor circuit. UL requirements call for such a switch to shut off current completely to the circuit, and not maintain a low current for monitoring when it is off. In addition, UL requirements require that the device be able to shut off in the event that there is an open circuit in the AC line, such as by a light burning out. Typically, these requirements have been met with a high current transformer switch which is bulky and expensive. This high current switch is in addition to a switch which is used by the sensor during its normal operation. Thus, two switches are needed for the circuit.

SUMMARY OF THE INVENTION

The present invention provides a shutoff circuit for a sensor controlled switching apparatus which does not require an additional high current switch. A two pole low current switch is used with one pole providing a control signal to the high current switch to open the high current switch. The other pole is connected between the AC line and a rectifier for a voltage regulator for the sensor circuitry. The second pole of the low current switch removes the power from the sensor circuitry. By piggy-backing a second pole on the switch, this switch can activate the primary power switch connected in series with the AC line without requiring a separate switch inserted in the AC line itself.

The present invention also provides an under voltage shutoff circuit which detects a loss of power at the output of the voltage regulator and provides a control pulse for shutting off the primary switch. Thus, for example, in the event of a light burning out, causing an opening in the AC line which drops the voltage from the regulator, the primary switch will be shut off for safety.

For a fuller understanding of the nature and advantages of the invention, reference should be made to the ensuing detailed description taken in conjunction with the accompanying drawings.

DESCRIPTION OF THE SPECIFIC EMBODIMENTS

Figure 1:
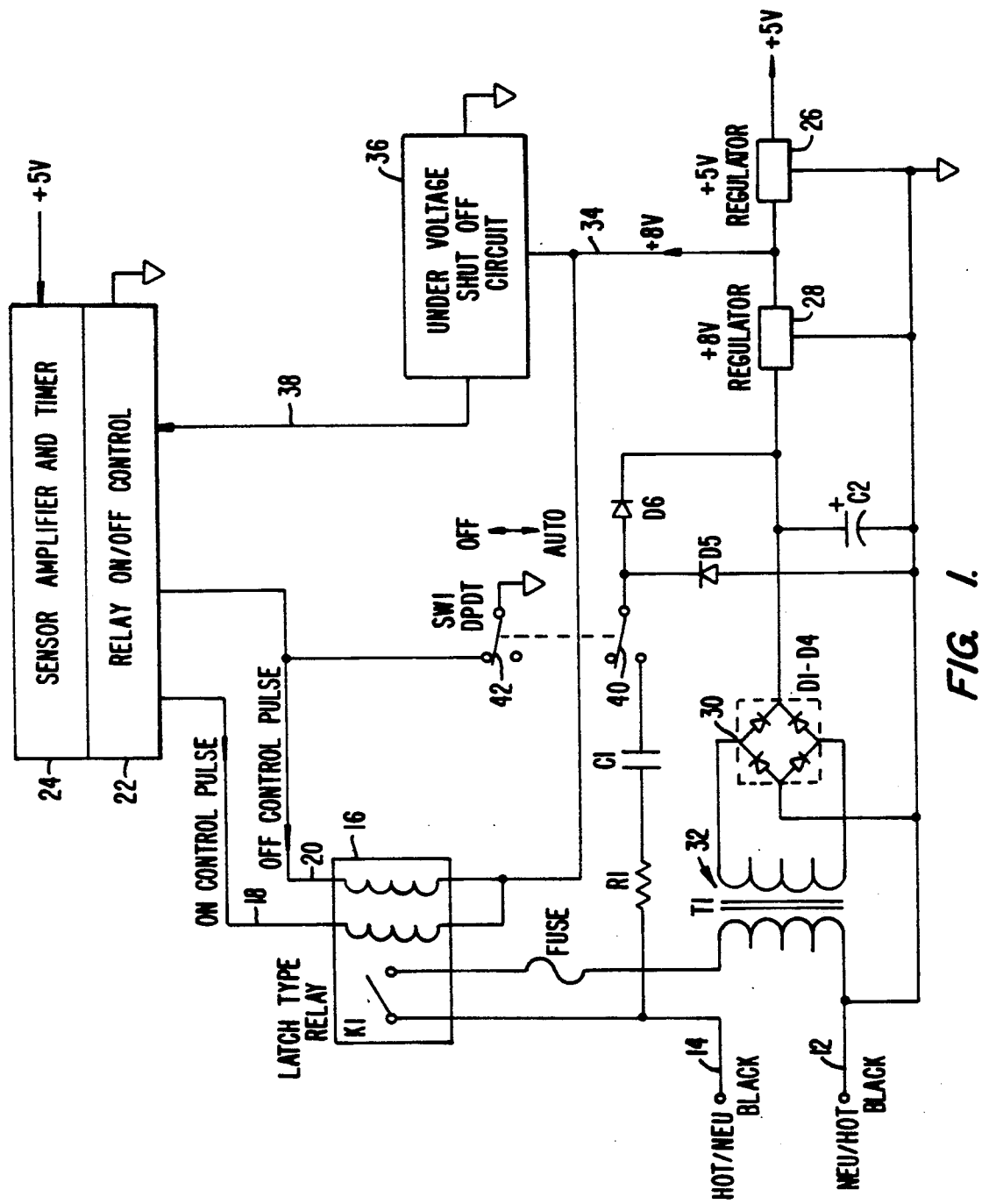
FIG. 1 is a diagram of the shutoff circuitry of the present invention.

FIG. 1 is a diagram of the shutoff circuit of the present invention. An AC line 12 is connected to the AC power source, and AC line 14 is coupled to the load (e.g., lights). A relay 16 has a switch K1 which opens the AC line, removing power from the load. This switch is controlled by electronic pulses provided on input lines 18 and 20 from a relay on/off control circuit 22. Relay control circuit 22 is in turn controlled by sensor amplifier and timer circuit 24. One example of the sensor amplifier and timer circuit is shown in U.S. Pat. No. 4,820,938, hereby incorporated herein by reference. This circuit detects movement in a room, and will turn on the lights or other load in response to movement, and turn them off in response to the absence of movement for a period of time.

Power for the circuit is provided from a 5 volt regulator 26, which in turn receives its input from an 8 volt regulator 28. Regulator 28 receives its voltage input from a rectifier 30 which is fed from a high current transformer 32 connected in the AC line 12, 14.

In the event of an open in the AC line, such as by a light burning out, no current will be provided through transformer 32 and the voltage at the output of regulator 28 will drop. This output 34 is provided to an undervoltage shutoff circuit 36. When circuit 36 detects the drop in voltage, it will provide a signal on a line 38 to relay control circuit 22, which will in turn off latch 16 through a pulse on line 20. Thus, switch K1 will be open for safety in the event of the burnout of the load.

When switch K1 in relay 16 is open, it is still necessary to provide power to sensor circuit 24 so it can monitor its sensors (for room occupancy or whatever) to determine when switch K1 should be closed again. The power for providing monitoring is provided through a resistor R1 and capacitor C1 through a pole 40 of switch SW1 to a rectifier composed of diodes D5 and D6 to regulator 28. Pole 40 is one of two poles of two pole switch SW1. The other pole, pole 42, couples input line 20 of relay 16 to ground to latch it in the off position. Switch SW1, when in the off position, latches switch K1 open and at the same time opens the connection between the AC line and regulator 28. This is a manually operated switch, which, when put in the off position, removes all power from the apparatus.

When switch SW1 is in the on position, a small amount of current is provided to 8 volt regulator 28 even though switch K1 is open.

Figure 2:
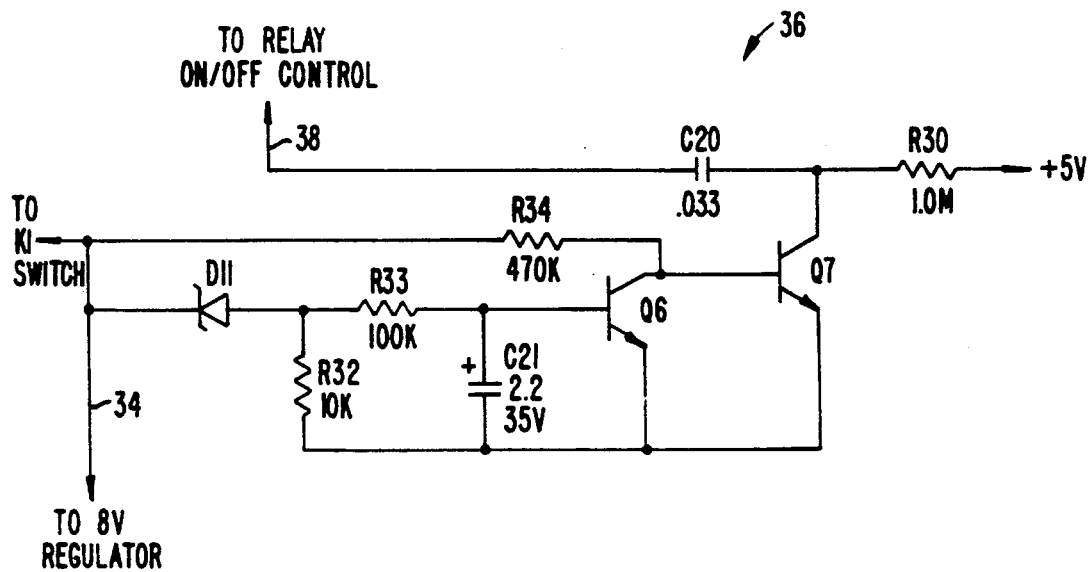
FIG. 2 is a detailed diagram of the under-voltage shutoff circuit of FIG. 1.

FIG. 2 shows under-voltage shutoff circuit 36 of FIG. 1 in more detail. Emitter coupled transistors Q6 and Q7 will be activated when the voltage drops as detected through the voltage divider of resistors R32 and R33 and zener diode D11.

Figure 3:
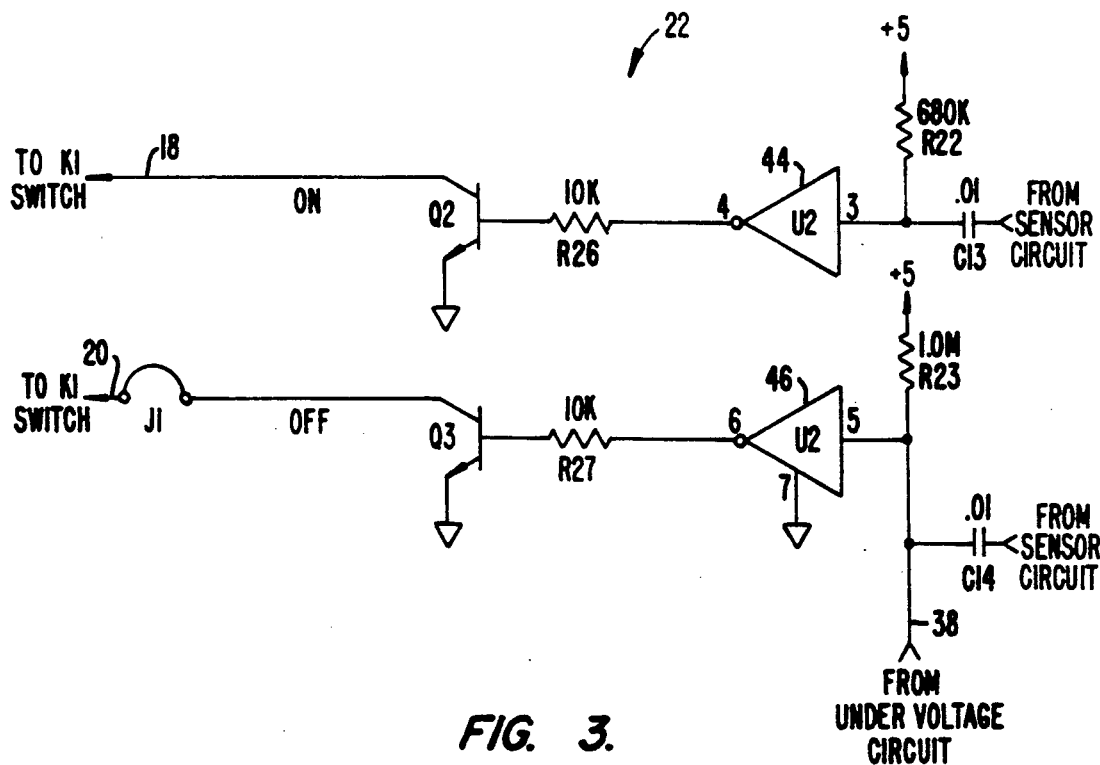
FIG. 3 is a detailed diagram of the relay on/off control circuit of FIG. 1.

FIG. 3 shows the relay on/off control circuit 22 of FIG. 1 in more detail. Transistors Q2 and Q3 provide the on and off pulses, respectively, to relay 16. These transistors are driven by inverters 44 and 46, respectively.

As will be understood by those familiar with the art, the present invention may be embodied in other specific forms without departing from the spirit or essential characteristics thereof. For example, instead of pole 42 of switch SW1 provided in connection to ground, it could provide a connection to a high voltage or initiate a pulse for a different type of relay 16. Accordingly, the disclosure of the preferred embodiment of the invention is intended to be illustrative, but not limiting, of the scope of the invention which is set forth in the following claims.

What is claimed is:

1. An apparatus for controlling power over an AC line to an AC load, comprising:
    an electronically controlled switch connected in series with said AC line;
    a sensor circuit for controlling said electronically controlled switch responsive to a sensor input;
    a low current rectifier connected to said AC line;
    a voltage regulator having an input coupled to said low current rectifier and an output coupled to said sensor circuit for providing power to said sensor circuit; and
    a two pole manually operated off switch for said apparatus, a first pole opening said connection between said low current rectifier and said AC line in an off position, and a second pole providing an off signal to said electronically controlled switch in said off position.

2. The apparatus of claim 1 further comprising an under-voltage shutoff circuit having an input coupled to an output of said voltage regulator and an output for providing an off signal to said electronically controlled switch.

3. The apparatus of claim 2 further comprising an off control circuit for providing an off pulse to said electronically controlled switch, said off control circuit having an input coupled to said sensor circuit and said under-voltage control circuit.

4. An apparatus for controlling power over an AC line to an AC load, comprising:
    an electronically controlled switch connected in series with said AC line;
    a sensor circuit for controlling said electronically controlled switch responsive to a sensor input;
    a low current rectifier connected to said AC line;
    a voltage regulator having an input coupled to said low current rectifier and an output coupled to said sensor circuit for providing power to said sensor circuit;
    a two pole manually operated off switch for said apparatus, a first pole opening said connection between said low current rectifier and said AC line in an off position, and a second pole providing an off signal to said electronically controlled switch in said off position;
    an under-voltage shut-off circuit having an input coupled to an output of said voltage regulator and an output for providing an off signal; and
    an off control circuit for providing an off pulse to said electronically controlled switch, said off control circuit having an input coupled to said sensor circuit and said under-voltage control circuit output.

5. An apparatus for controlling power over an AC line to an AC load, comprising:
    an electronically controlled switch connected in series with said AC line;
    a sensor circuit for controlling said electronically controlled switch responsive to a sensor input;
    means including a low current rectifier, connected to said AC line, for providing power to said sensor circuit; and
    a two pole manually operated off switch for said apparatus, a first pole opening said connection between said low current rectifier and said AC line in an off position, and a second pole providing an off signal to said electronically controlled switch in said off position.

6. The apparatus of claim 5 further comprising a under-voltage shutoff circuit having an input coupled to an output of said means for providing power and an output for providing an off signal to said electronically controlled switch.

7. The apparatus of claim 6 further comprising an off control circuit for providing an off pulse to said electronically controlled switch, said off control circuit having an input coupled to said sensor circuit and said under-voltage control circuit.

* * * * *